United States Patent
Han et al.

(10) Patent No.: US 9,222,774 B2
(45) Date of Patent: Dec. 29, 2015

(54) CLINOCOMPASS FOR MEASURING STRIKE AND DIP ON IRREGULAR GEOLOGICAL OUTCROP, AND METHOD OF MEASURING STRIKE AND DIP BY USING THE SAME

(71) Applicant: KOREA INSTITUTE OF GEOSCIENCE AND MINERAL RESOURCES, Daejeon (KR)

(72) Inventors: Raehee Han, Seoul (KR); Ki-Sung Sung, Incheon (KR); Jeong-Chan Kim, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 129 days.

(21) Appl. No.: 14/194,146

(22) Filed: Feb. 28, 2014

(65) Prior Publication Data

US 2015/0128430 A1    May 14, 2015

(30) Foreign Application Priority Data

Nov. 13, 2013 (KR) .......................... 10-2013-0137776

(51) Int. Cl.
*G01C 17/02* (2006.01)
*G01C 9/28* (2006.01)

(52) U.S. Cl.
CPC . *G01C 17/02* (2013.01); *G01C 9/28* (2013.01)

(58) Field of Classification Search
CPC ........ G01C 17/02; G01C 17/18; G01C 17/28; G01C 9/00; G01C 9/02; G01C 17/00
USPC ............................... 33/355 D, 343
See application file for complete search history.

(56) References Cited

U.S. PATENT DOCUMENTS

| | | | | |
|---|---|---|---|---|
| 5,287,628 A * | 2/1994 | Yamaguchi | ............ | G01C 17/30 33/361 |
| 5,444,916 A * | 8/1995 | Fukushima | ............ | G01C 17/28 33/361 |
| 2013/0239422 A1 * | 9/2013 | Kang | .................... | G01C 17/16 33/354 |
| 2014/0101949 A1 * | 4/2014 | You-Hong | ............... | G01C 9/02 33/343 |
| 2014/0101951 A1 * | 4/2014 | You-Hong | ............... | G01C 9/34 33/354 |
| 2015/0128430 A1 * | 5/2015 | Han | ........................ | G01C 9/28 33/301 |
| 2015/0185004 A1 * | 7/2015 | Ryoo | ....................... | E02D 1/00 33/301 |

FOREIGN PATENT DOCUMENTS

| | | |
|---|---|---|
| KR | 10-2009-0062490 | 6/2009 |
| KR | 10-1115604 | 3/2012 |
| KR | 10-1204970 | 11/2012 |
| KR | 10-1205487 | 11/2012 |
| KR | 10-1227924 | 1/2013 |

* cited by examiner

*Primary Examiner* — Yaritza Guadalupe-McCall
(74) *Attorney, Agent, or Firm* — Christie, Parker & Hale, LLP

(57) ABSTRACT

Disclosed is a clinocompass for measuring a strike and a dip on an irregular geological outcrop and a method of measuring the strike and the dip by using the same. Since the level meter of the clinometer is supported by providing a support force and a fixing force on an irregular geological outcrop having no exposed flat plane, the clinocompass serves as a supporting member or a fixing member for the measurement of the strike and the dip on an irregular geological outcrop having no exposed flat plane. Accordingly, the clinocompass has a structure to measure the strike and the dip suitable for the geological structure and the orientation of the outcrop having no exposed flat plane, so that the strike and the dip are usefully measured.

10 Claims, 10 Drawing Sheets

CLINOCOMPASS FOR MEASURING STRIKE AND DIP ON IRREGULAR GEOLOGICAL OUTCROP, AND METHOD OF MEASURING STRIKE AND DIP BY USING THE SAME

CROSS-REFERENCE TO RELATED APPLICATION

This application claims the benefit under 35 U.S.C. §119 of Korean Patent Application No. 10-2013-0137776 filed on Nov. 13, 2013 in the Korean Intellectual Property Office, the entirety of which disclosure is incorporated herein by reference.

BACKGROUND OF THE INVENTION

1) Field of the invention

The present invention relates to a clinocompass for measuring a strike and a dip on an irregular geological outcrop and a method of measuring the strike and the dip by using the same. In more particular, the present invention a clinocompass for measuring a strike and a dip on an irregular geological outcrop having no exposed flat plane and a method of measuring the strike and the dip by using the same.

2) Background of Related Art

In general, a geological outcrop is a bedrock or a deposit that is directly exposed onto the surface of the Earth without being covered by soil or vegetation. The geological outcrop is mainly developed in a mountain at a dry area.

A work of observing the outcrop is basically performed for a geological survey. The work of observing the outcrop provides important information to determine a geological phenomenon for a worker to make a geological map of an observation target area or estimate the geological structure of the observation target area.

Meanwhile, a clinometer is a device utilized to measure a strike (the direction of the line of the intersection between a bedding plane and a horizontal plane) and a dip (an angle between the bedding plane and the horizontal plane) to detect the spatial distribution state of the surface of the Earth. The clinometer is a significantly useful portable device for a work of detecting the geological structures developed in several outcrops as well as the geological survey in a field and a site.

The clinometer is named "clinocompass" or "inclinometer". Most clinometers include a compass and a level meter, and include strike gradations and a strike indicator for the measurement of the strike, and dip gradations and a dip indicator for the measurement of the strike.

FIGS. 1a and 1b illustrate examples to measure a strike and a dip by using a clinometer 1. As shown in FIGS. 1a and 1b, the strike may be measured by reading the strike gradations and the strike direction indicated by a strike indicator in the state that a clinometer 1 is horizontally arranged with respect to a horizontal plane, and the dip may be measured by reading dip gradations and a dip direction indicated by a dip indicator in the state that the clinometer 1 is arranged perpendicularly to the directional line of the dip right-angled with respect to the strike.

However, a typical type of a clinometer according to the related art can usefully measure the strike and the dip in a simple manner on a geographical outcrop where a flat bedding plane is exposed. However, even the clinometer has a significant difficulty in that the strike and the dip are measured at related positions of joint planes where a flat plane is less exposed or an irregular geological outcrop having a complex shape.

Accordingly, the geographical structure and direction may not be sufficiently detected, and the analysis error of the strike and the dip according to the geographical structure may occur with high probability. In addition, when a geographical map is made, the accuracy and the precision of the geographical map may be inevitably degraded.

Meanwhile, patent document 1 among cited references discloses the constitution in a clinometer having embedded measuring rod and plate, which includes a body having an embedded measuring rod and plate sliding from an inside of the body and exposed to an outside of the body to closely make contact with stratum joint planes, and a method of measuring a strike and a dip by using the same.

Patent document 2 among cited references discloses the constitutions in a clinometer having detachable measuring rod and plate, which includes an embedded measuring rod sliding out of an inside of a support detachably coupled with a body and exposed to the outside to closely make contact with the stratum joint planes and a measuring plate detachably coupled with the support, and a method of measuring a strike and a dip by using the same.

CITED REFERENCES

Patent Document 1: Korea Registration No. 10-1205487 (issued on Nov. 27, 2012) titled "Clinometer having embedded measuring rod and plate and method of measuring strike and dip by using the same".

Patent Document 2: Korea Registration No. 10-1227924 (issued on Jan. 30, 2013) titled "Clinometer having detachable measuring rod and plate and method of measuring strike and dip by using the same".

SUMMARY OF THE INVENTION

One object of the present invention is to provide a clinocompass for measuring a strike and a dip on an irregular geological outcrop, capable of more usefully measuring the strike and the dip under the condition that a flat plane is exposed, and a method of measuring the strike and the dip by using the same.

Another object of the present invention is to provide a clinocompass for measuring a strike and a dip on an irregular geological outcrop, capable of serving as a support for the measurement of the strike and the dip by providing a support force on an irregular geological outcrop having no exposed flat plane, and measuring the strike and the dip suitably for the geological structure and the orientation of the outcrop, and a method of measuring the strike and the dip by using the same.

Still another object of the present invention is to provide a clinometer for measuring a strike and a dip on an irregular geological outcrop, capable of providing the convenience and the easiness for a user when the user uses a clinometer, and a method of measuring the strike and the dip by using the same.

The present invention suggests several objects without limitation to the above objects, and other objects, which are not described, can be clearly comprehended from the following description by those skilled in the art.

In order to accomplish the above objects, there is provided a clinocompass for measuring a strike and a dip on an irregular geological outcrop. The clinocompass includes a base plate, first and second compasses provided at both side portions of a top surface of the base plate in opposition to each other such that each of the first and second compasses is rotatable outwardly, a first auxiliary compass provided on a top surface of the first compass and installed rotatably inwardly, and a second auxiliary compass provided on a top surface of the second compass and installed rotatably inwardly. The first and second compasses are coupled with the base plate by spring hinges, respectively, to have elasticity such that the first and second compasses are elastically installed on the base plate to return to initial mounting positions of the first and second compasses, and the first and second auxiliary compasses are coupled with the first and second compasses by spring hinges, respectively, to have elasticity such that the first and second auxiliary compasses are elastically mounted on the first and second compasses matching with the first and second auxiliary compasses to return to initial mounting positions of the first and second auxiliary compasses.

In this case, preferably, the first and second compasses pivot outwardly and elastically return to the initial mounting positions of the first and second compasses about the spring hinges by mounting the spring hinges on lower end portions of bodies of the first and second compasses, and the first and second auxiliary compasses pivot inwardly, and elastically return to the initial mounting positions of the first and second auxiliary compasses about the spring hinges by mounting the spring hinge on upper end portions of bodies of the first and second auxiliary compasses.

In addition, preferably, a rubber member or rubber members are coupled with one longitudinal surface or both longitudinal surfaces of each of the first compass, the second compass, the first auxiliary compass, and the second auxiliary compass.

In addition, the clinocompass may further include a measuring unit and a level meter provided on the base plate to measure the strike and the dip.

Meanwhile, there is provided a clinocompass for measuring a strike and a dip on an irregular geological outcrop. The clinocompass includes a clinometer comprising a measuring unit and a level meter to measure the strike and the dip, a base plate coupled with the clinometer through a coupling member, first and second compasses provided at both side portions of a top surface of the base plate in opposition to each other such that each of the first and second compasses is rotatable outwardly, a first auxiliary compass provided on a top surface of the first compass and installed rotatably inwardly, and a second auxiliary compass provided on a top surface of the second compass and installed rotatably inwardly. The first and second compasses are coupled with the base plate by spring hinges, respectively, to have elasticity such that the first and second compasses are elastically installed on the base plate to return to initial mounting positions of the first and second compasses, and the first and second auxiliary compasses are coupled with the first and second auxiliary compasses by spring hinges, respectively, to have elasticity such that the first and second auxiliary compasses are elastically installed on the first and second compasses matching with the first and second auxiliary compasses, respectively, to return to initial mounting positions of the first and second auxiliary compasses.

In this case, preferably, the coupling member comprises a bellows.

In this case, preferably, the first and second compasses pivot outwardly and elastically return to the initial mounting positions of the first and second compasses about the spring hinges by mounting the spring hinges on lower end portions of bodies of the first and second compasses, respectively, and the first and second auxiliary compasses pivot inwardly, and elastically return to the initial mounting positions of the first and second auxiliary compasses about the spring hinges by mounting the spring hinge on upper end portions of bodies of the first and second auxiliary compasses, respectively.

Further, preferably, a rubber member or rubber members are coupled with one longitudinal surface or both longitudinal surfaces of each of the first compass, the second compass, the first auxiliary compass, and the second auxiliary compass.

Meanwhile, there is provided a method of measuring a strike. The method includes applying an external pressure to first and second compasses provided on a base plate to rotate the first and second compasses counterclockwise and clockwise, respectively, such that the first and second compasses are rotatable outwardly of the base plate to clamp a cutting plane of an outcrop having no exposed flat plane and fix the base plate, applying an external pressure to first and second auxiliary compasses provided on the first and second compasses to rotate the first and second auxiliary compasses counterclockwise and clockwise, respectively, such that the first and second auxiliary compasses are rotatable inwardly of the base plate to doubly clamp a cutting plane of the outcrop and doubly fix the base plate, adjusting a level of the clinometer coupled with the base plate through a coupling member by using a level meter such that the level of the clinometer is maintained with respect to the outcrop having no exposed flat plane, and measuring the strike on the outcrop where the flat plane is not exposed by using a measuring unit of the clinometer.

Meanwhile, there is provided a method of measuring a dip. The method includes applying an external pressure to first and second compasses provided on a base plate to rotate the first and second compasses counterclockwise and clockwise, respectively, such that the first and second compasses are rotatable outwardly of the base plate to clamp a cutting plane of an outcrop having no exposed flat plane and fix the base plate, applying an external pressure to first and second auxiliary compasses provided on the first and second compasses to rotate the first and second auxiliary compasses counterclockwise and clockwise, respectively, such that the first and second auxiliary compasses are rotatable inwardly of the base plate to doubly clamp a cutting plane of the outcrop and doubly fix the base plate, arranging the clinometer, which is coupled with the base plate through a coupling member, on the base plate to maintain the clinometer perpendicularly to the strike on the outcrop having no exposed flat plane, and measuring the dip on the outcrop having no exposed flat plane by using a measuring unit of the clinometer.

The details of other embodiments are described in the detailed description and shown in the accompanying drawings.

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

As described above, according to the present invention, since the level meter of the clinometer can be supported by providing a support force and a fixing force on an irregular geological outcrop having no exposed flat plane, the clinocompass serves as a supporting member or a fixing member for the measurement of the strike and the dip on an irregular geological outcrop having no exposed flat plane. Accordingly, the clinocompass has a structure to measure the strike and the dip suitable for the geological structure and the orientation of the outcrop having no exposed flat plane, so that the strike and the dip can be usefully measured.

In addition, when the strike and the dip are measured on the irregular geological outcrop, a worker can conveniently and easily measure the strike and the dip by using the clinometer.

BRIEF DESCRIPTION OF DRAWINGS

FIGS. 1a and 1b illustrate examples to measure a strike and a dip by using a clinometer, in which FIG. 1a illustrates the measurement of the strike and FIG. 1b illustrates the measurement of the dip.

DETAILED DESCRIPTION OF THE INVENTION

Figure 1A:
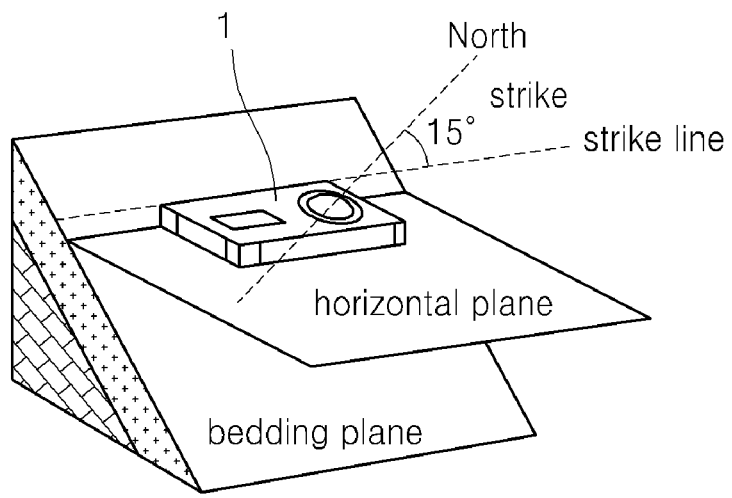
Figure 1B:
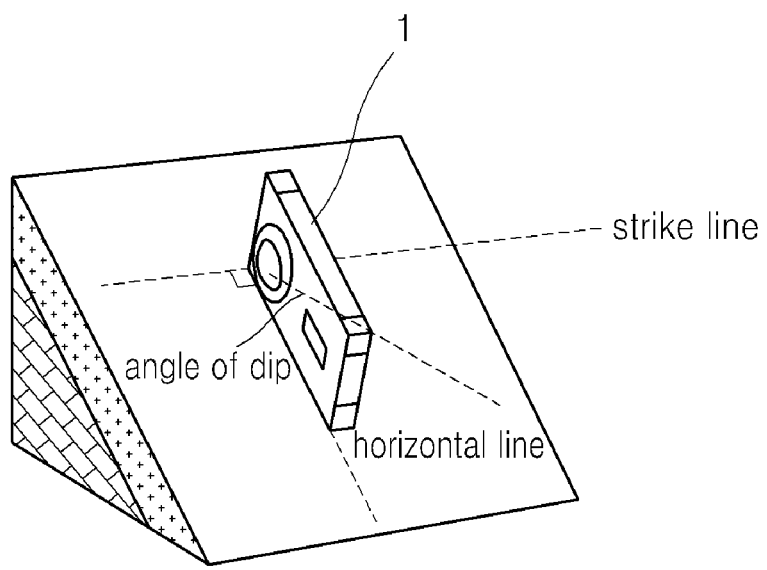
Figure 2:
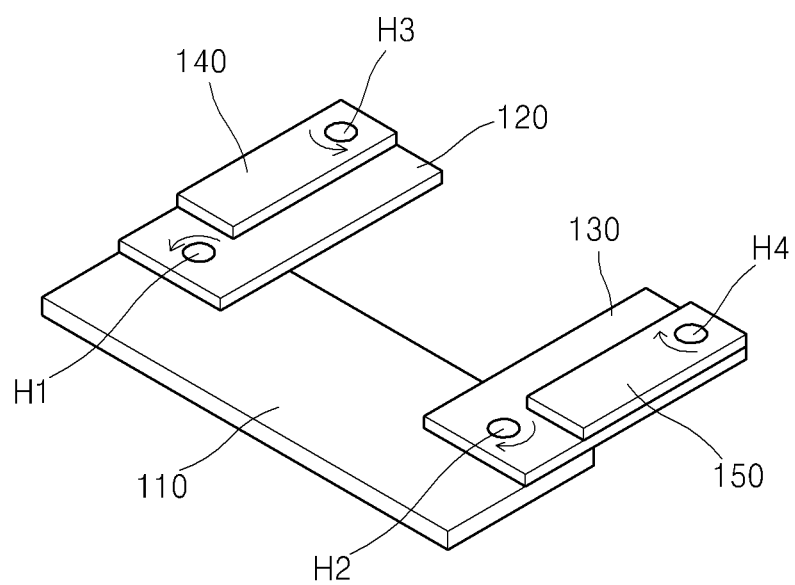
FIG. 2 is a perspective view showing a clinocompass according to an exemplary embodiment of the present invention.

Hereinafter, a clinocompass for measuring a strike and a dip on an irregular geological outcrop and a method of measuring the strike and the dip by using the same according to an exemplary embodiment of the present invention will be described in detail with reference to accompanying drawings.

Referring to FIGS. 2 to 5, a clinocompass for measuring a strike and a dip on an irregular geological outcrop according to an exemplary embodiment of the present invention includes a base plate 110, first and second compasses 120 and 130 provided at both side portions of a top surface of the base plate 110 in opposition to each other and installed rotatably outwardly, a first auxiliary compass 140 provided on the top surface of the first compass 120 and installed rotatably inwardly, and a second auxiliary compass 150 provided on a top surface of the second compass 130 and installed rotatably inwardly.

In this case, the first and second compasses 120 and 130 are coupled to the base plate 110 by mounting spring hinges H1 and H2, respectively, so that the first and second compasses 120 and 130 are elastically installed on the top surface of the base plate 110. Accordingly, the first and second compasses 120 and 130 have elasticity to return to the initial mounting positions thereof when an external pressure is released.

The first and second auxiliary compasses 140 and 150 are supported and coupled to the first and second compasses 120 and 130, respectively, by mounting spring hinges H3 and H3, so that the first and second auxiliary compasses 140 and 150 are elastically mounted on top surfaces of the first and second compasses 120 and 130, respectively. Accordingly, the first and second auxiliary compasses 140 and 150 have elasticity to return to the initial mounting positions thereof when an external pressure is released.

In detail, preferably, the first and second compasses 120 and 130 pivot outwardly, and elastically return to the initial mounting positions thereof about the spring hinges H1 and H2 when an external pressure is released by mounting the spring hinge H1 and H2 on lower end portions of bodies of the first and second compasses 120 and 130.

Figure 3:
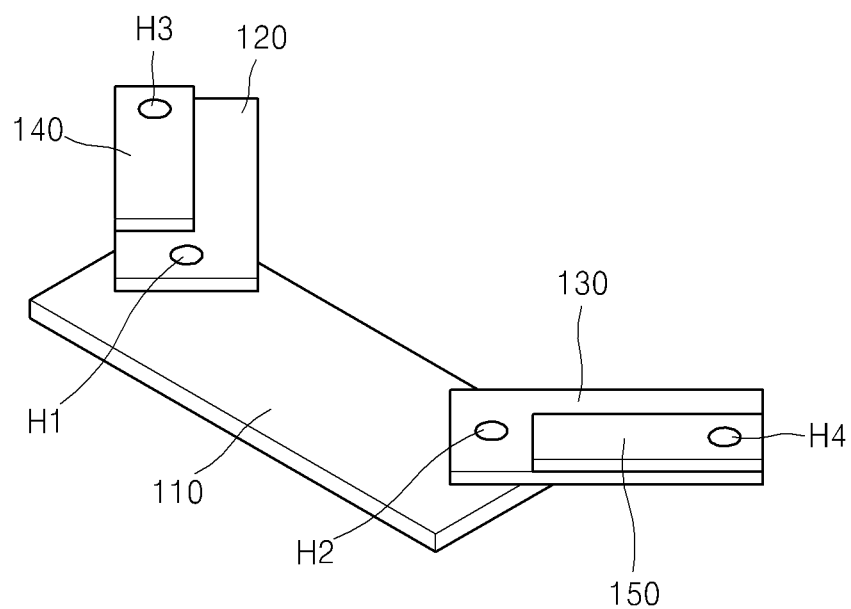
FIG. 3 is a perspective view showing a first operating state by first and second compasses in the clinocompass according to the present invention.

FIG. 3 is a perspective view showing a first operating state by the first and second compasses 120 and 130 in the clinocompass according to the present invention. In detail, FIG. 3 shows that the base plate 110 may be fixed to a cutting plane of the irregular geological outcrop for the measurement of a strike and a dip in the form of a clamp by using elastic force to elastically return to the original state and an external spreading operation caused by an external pressure.

Similarly, preferably, the first and second auxiliary compasses 140 and 150 pivot inwardly, and elastically return to the initial mounting positions thereof about the spring hinges H3 and H4 when an external pressure is released by mounting the spring hinge H3 and H4 on upper end portions of bodies of the first and second auxiliary compasses 140 and 150.

Figure 4:
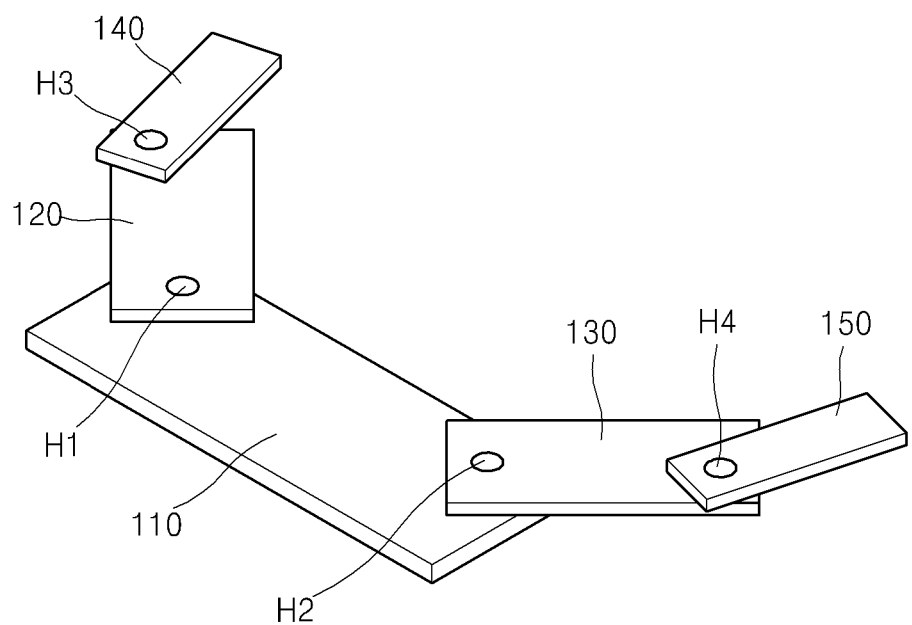
FIG. 4 is a perspective view showing a second operating state by first and second compasses in the clinocompass according to the present invention.
Figure 5:
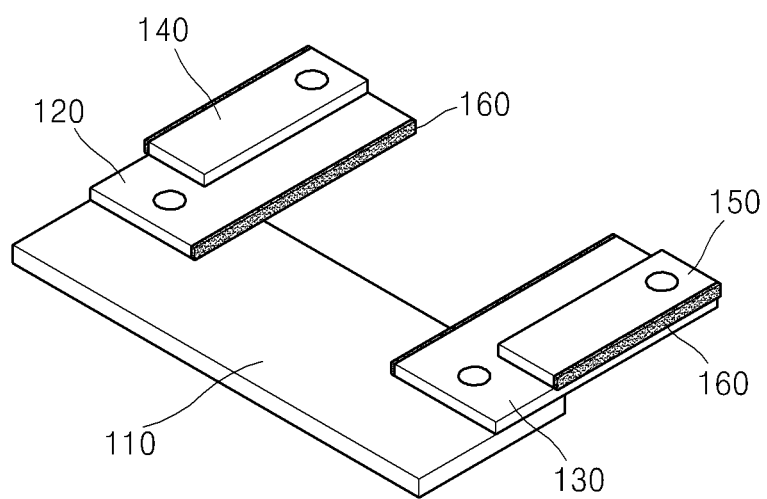
FIG. 5 is a perspective view showing the structure including a rubber member according to the present invention.

FIG. 4 is a perspective view showing a second operating state by the first and second auxiliary compasses 140 and 150 according to the present invention based on the rotation caused by the external pressure and the elastic force to return to the original positions thereof. FIG. 4 shows the operating state to add a fixing force of the base plate 110 to a cutting plane of the irregular geological outcrop for the measurement of a strike and a dip in the form of a clamp.

In other words, the base plate 110 may be doubly supported and fixed by the first and second auxiliary compasses 140 and 150 as well as the first and second compasses 120 and 130 matching with the first and second auxiliary compasses 140 and 150, respectively.

Preferably, a rubber member 160 or rubber members 160 are attached to one longitudinal surface or both longitudinal surfaces of each of the first compass 120, the second compass 130, the first auxiliary compass 140, and the second auxiliary compass 150, respectively, for the use thereof.

In this case, the rubber member 160 may be attached only to a longitudinal inner surface of a body of each of the first and second compasses 120 and 130. The rubber member 160 may be attached only to a longitudinal outer surface of a body of each of the first and second auxiliary compasses 140 and 150.

In this case, the rubber member 160 may be a component to perform a buffer function and increase the lifespan of the clinocompass.

Figure 6:
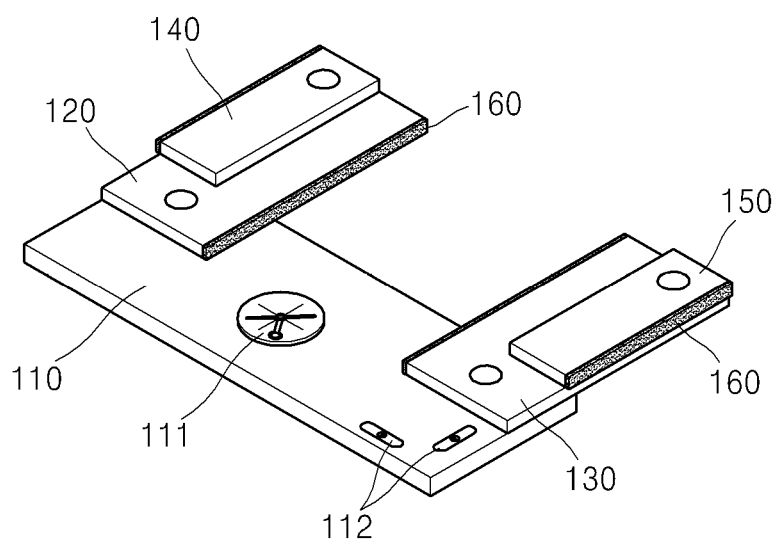
FIG. 6 is a perspective view showing a clinocompass according to another embodiment of the present invention.

Further, as shown in FIG. 6, the base plate 110 may include a measuring unit 111 and a level meter 112.

In this case, the measuring unit 111 may have strike gradations and a strike indicator to measure the strike, and dip gradations and a dip indicator to measure a dip.

Alternatively, the measuring unit 111 and the level meter 112 may be configured for digital measurement.

Figure 7:
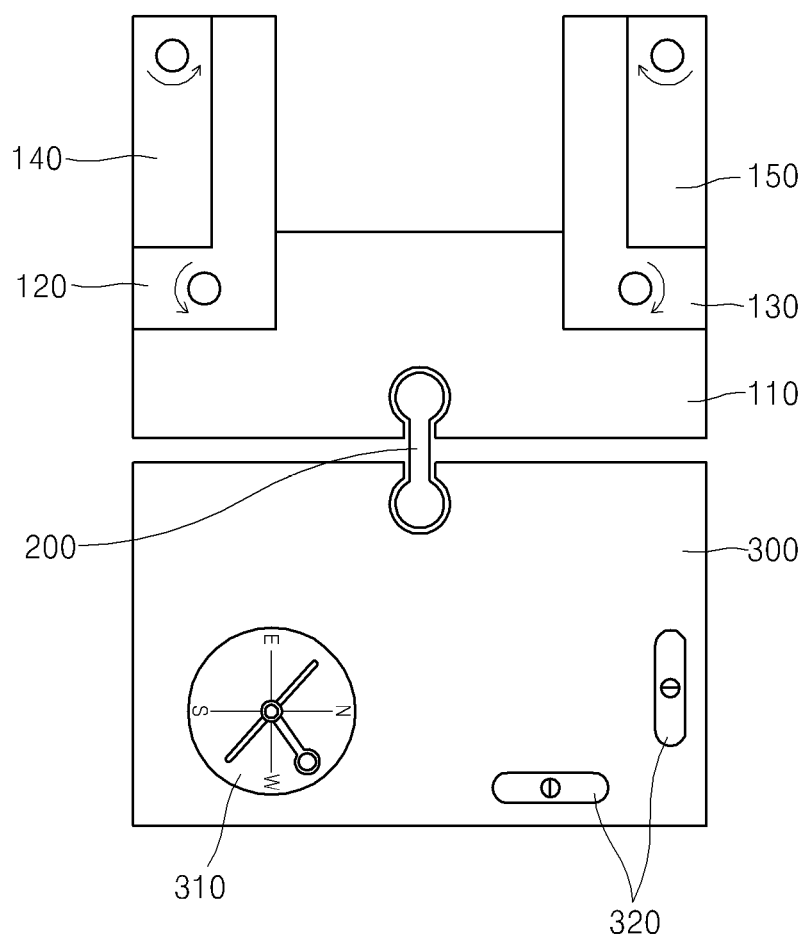
FIG. 7 is a perspective view showing a clinocompass having a coupling structure with a clinometer according to still another embodiment of the present invention.

Meanwhile, referring to FIG. 7, in the clinocompass having the above structure, the base plate 110 may be coupled to the clinometer 300 by a coupling member 200 for the use of the base plate 110.

The clinometer 300 may include various clinometers including the measuring unit 310 and the level meter 320 to measure the strike and the dip.

In this case, the measuring unit 310 and the level meter 320 of the clinometer 300 may be provided in an analogue type allowing analogue measurement or a digital type allowing digital measurement.

In this case, preferably, the coupling member 200 includes a bellows so that the base plate 110 and the clinometer 300 coupled to the base plate 110 through the coupling member 200 can freely move independently from each other.

The base plate 110 and the clinometer 300 can freely move due to the coupling member 200, so that a strike or a dip can be easily measured on the irregular outcrop having no exposed flat plane or on the complexly-shaped outcrop to make it difficult to measure the strike or the dip.

Figure 8:
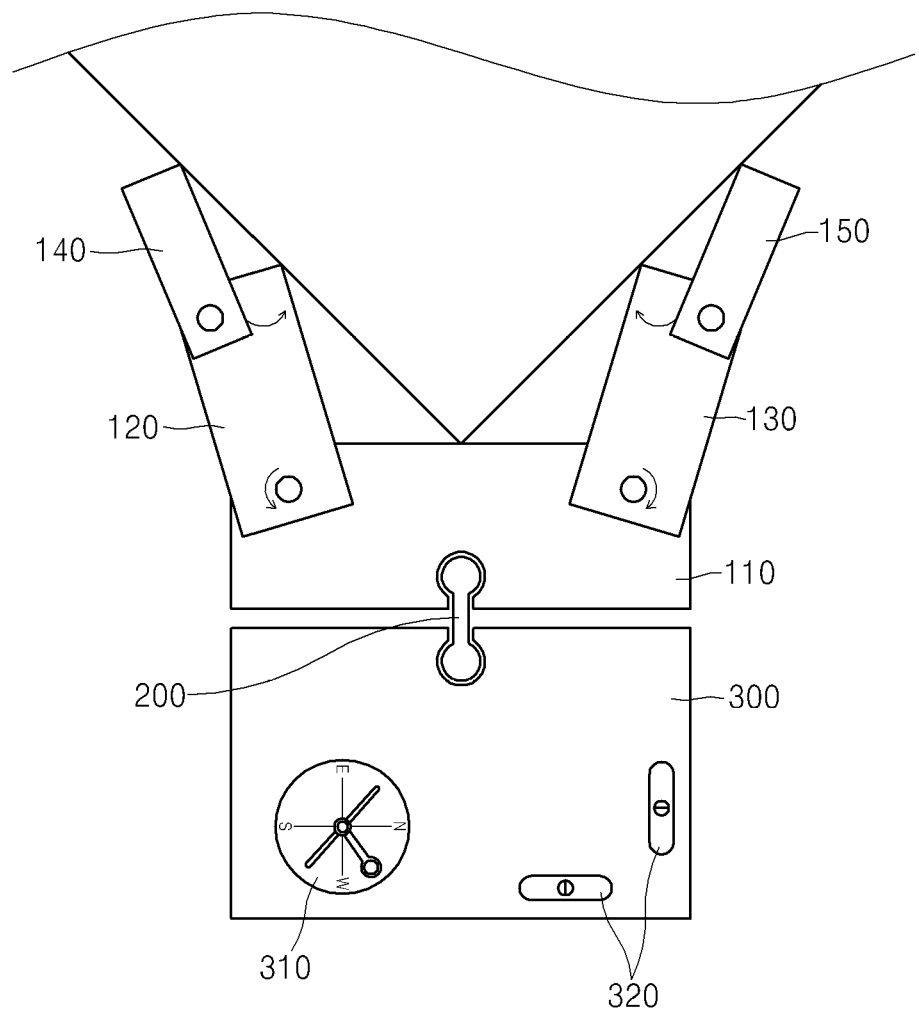
FIG. 8 is a view showing one example to explain the use state of the clinocompass according to the embodiment of the present invention.

FIG. 8 is a view showing one example to explain the use state of the clinocompass according to the embodiment of the present invention which includes the first and second compasses 120 and 130, the first and second auxiliary compasses 140 and 150, and the clinometer 300 coupled to the base plate 110 through the coupling member 200.

Referring to FIG. 8, in the case of the outcrop having no exposed flat plane to make it difficult to measure the strike and the dip, an external pressure is applied to the first and second compasses 120 and 130 matching with each other to outwardly spread the first and second compasses 120 and 130. In this state, the clinocompass is provided on the cutting plane of the irregular geological outcrop. Then, when the external pressure is released, the cutting plane of the geological outcrop is clamped by the first and second compasses 120 and 130 due to the elasticity of the spring hinges H1 and H2, so that the base plate 110 is fixed.

In addition, if an external pressure is applied to the first and second auxiliary compasses 140 and 150 matching with each other to rotate the first and second auxiliary compasses 140 and 150, and then released, the cutting plane of the geological outcrop is clamped by the first and second auxiliary compasses 140 and 150 due to the elasticity of the spring hinges H3 and H4. Accordingly, the base platen 110 may be fixed doubly.

Therefore, the clinocompass may be fixedly provided on the outcrop having no exposed flat plane, so that a measuring device such as the clinometer 300 can be more easily provided horizontally or vertically.

Figure 9:
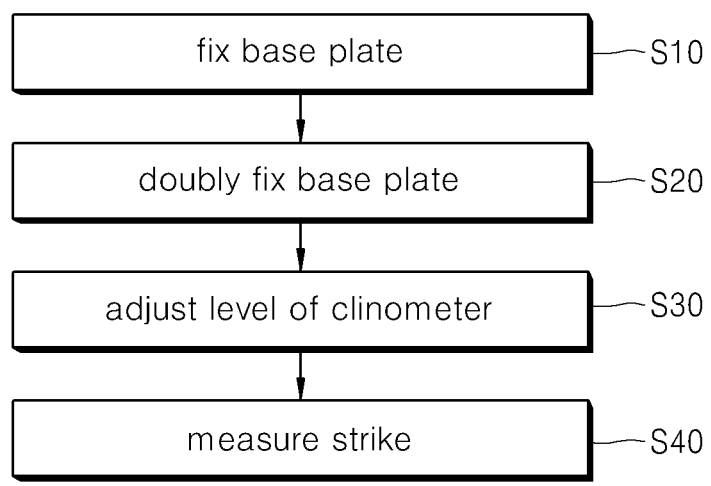
FIG. 9 is a block diagram showing a method of measuring a strike according to the present invention.

FIG. 9 is a block diagram showing a method of measuring a strike according to the present invention. Hereinafter, the method of measuring the strike by using the clinocompass including the clinometer 300 coupled to the base plate 110 through the coupling member 200 will be described.

First, an external pressure is applied to the first and second compasses 120 and 130 provided on the base plate 110 to rotate the first and second compasses 120 and 130 counterclockwise and clockwise, respectively, so that the first and second compasses 120 and 130 are rotatable outwardly of the base plate 110. Then, the external pressure is released, so that the cutting plane of the outcrop having no exposed flat plane is clamped to fix the base plate 110 (step S10).

An external pressure is applied to the first and second auxiliary compasses 140 and 150 provided on the first and second compasses 120 and 130 to rotate the first and second auxiliary compasses 140 and 150 counterclockwise and clockwise, respectively, so that the first and second auxiliary compasses 140 and 150 are rotatable inwardly of the base plate 110. Accordingly, the cutting plane of the outcrop having no exposed flat plane is doubly clamped to doubly fix the base plate 110 (step S20).

The level of the clinometer 300 coupled to the base plate 110 through the coupling member 200 is adjusted with respect to the outcrop having no exposed flat plane by using the level meter 320 (step S30).

In this case, since the clinometer 300 having the measuring unit 310 is coupled to the base plate 110 through the coupling member 200 such as a bellows, the clinometer 300 can freely move. Accordingly, the clinometer 300 may be freely arranged in the above connection state.

The strike is measured on the outcrop having no exposed flat plane by using the measuring unit 310 of the clinometer 300 (step S40).

Figure 10:
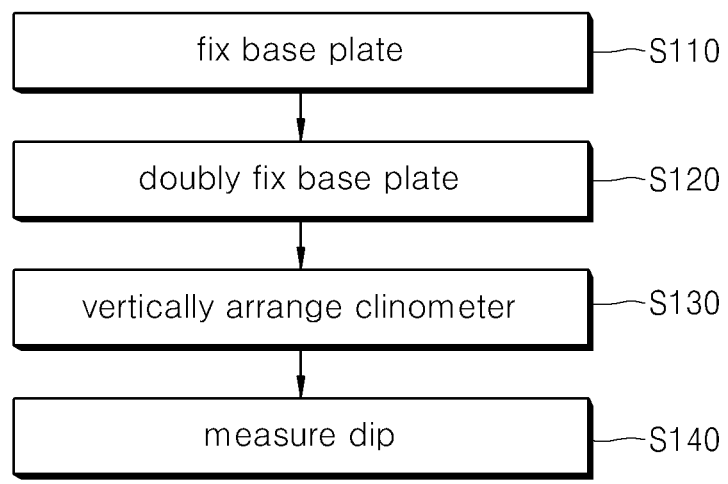
FIG. 10 is a block diagram showing a method of measuring a dip according to the present invention.

FIG. 10 is a block diagram showing a method of measuring a dip according to the present invention. Hereinafter, the method of measuring the dip by using the clinocompass including the clinometer 300 coupled to the base plate 110 through the coupling member 200 will be described.

First, an external pressure is applied to the first and second compasses 120 and 130 provided on the base plate 110 to rotate the first and second compasses 120 and 130 counterclockwise and clockwise, respectively, so that the first and second compasses 120 and 130 are rotatable outwardly of the base plate 110, so the cutting plane of the outcrop having no exposed flat plane is clamped to fix the base plate 110 (step S110).

An external pressure is applied to the first and second auxiliary compasses 140 and 150 provided on the first and second compasses 120 and 130 to rotate the first and second auxiliary compasses 140 and 150 counterclockwise and clockwise, respectively, so that the first and second auxiliary compasses 140 and 150 are rotatable inwardly of the base plate 110. Accordingly, the cutting plane of the outcrop is doubly clamped to doubly fix the base plate 110 (step S120).

The clinometer 300 coupled to the base plate 110 through the coupling member 200 is arranged in such a manner that the clinometer 300 is maintained perpendicularly to the strike on the outcrop having no exposed flat plane (step S130).

In this case, since the clinometer 300 having the measuring unit 310 is coupled to the base plate 110 through the coupling member 200 such as a bellows so that the clinometer 300 can freely move with respect to the base plate 110, the clinometer 300 may be freely arranged in the above connection state.

The dip is measured on the outcrop having no exposed flat plane by using the measuring unit 310 of the clinometer 300 (step S140).

Although the present invention has been described by making reference to the embodiments and accompanying drawings, it should be understood that the present invention is not limited to the embodiments but includes all modifications, equivalents and alternatives. Accordingly, those skilled in the art should understand the spirit and scope of the present invention as defined in the following claims. In addition, those skilled in the art should understand that the equivalents and the modifications belong to the scope of the spirit of the present invention.

What is claimed is:

1. A clinocompass for measuring a strike and a dip on an irregular geological outcrop, the clinocompass comprising:
   a base plate;
   first and second compasses provided at both side portions of a top surface of the base plate in opposition to each other such that each of the first and second compasses is rotatable outwardly;
   a first auxiliary compass provided on a top surface of the first compass and rotatable inwardly; and
   a second auxiliary compass provided on a top surface of the second compass and rotatable inwardly,
   wherein the first and second compasses are elastically installed on the base plate through a coupling with first spring hinges, respectively, such that the first and second compasses have elasticity to return to initial mounting positions of the first and second compasses, and
   the first and second auxiliary compasses are elastically installed on the first and second compasses matching with the first and second auxiliary compasses through a coupling with second spring hinges, respectively, such that the first and second auxiliary compasses have elasticity to return to initial mounting positions of the first and second auxiliary compasses.

2. The clinocompass of claim 1, wherein the first spring hinges are installed on lower end portions of bodies of the first and second compasses so that the first and second compasses pivot outwardly and elastically return to the initial mounting positions of the first and second compasses about the first spring hinges, and the second spring hinges are installed on upper end portions of bodies of the first and second auxiliary compasses so that the first and second auxiliary compasses pivot inwardly and elastically return to the initial mounting positions of the first and second auxiliary compasses about the spring hinges.

3. The clinocompass of claim 1, wherein a rubber member is coupled to one longitudinal surface or both longitudinal surfaces of each of the first compass, the second compass, the first auxiliary compass, and the second auxiliary compass.

4. The clinocompass of claim 1, further comprising a measuring unit and a level meter provided on the base plate to measure the strike and the dip.

5. A clinocompass for measuring a strike and a dip on an irregular geological outcrop, the clinocompass comprising:
a clinometer comprising a measuring unit and a level meter to measure the strike and the dip;
a base plate coupled with the clinometer through a coupling member;
first and second compasses provided at both side portions of a top surface of the base plate in opposition to each other such that each of the first and second compasses is outwardly rotatable;
a first auxiliary compass provided on a top surface of the first compass and rotatable inwardly; and
a second auxiliary compass provided on a top surface of the second compass and rotatable inwardly,
wherein the first and second compasses are elastically installed on the base plate through couplings of first spring hinges such that the first and second compasses have elasticity to return to initial mounting positions of the first and second compasses, and
the first and second auxiliary compasses are elastically installed on the first and second compasses matching with the first and second auxiliary compasses through couplings with second spring hinges, respectively, such that the first and second auxiliary compasses have elasticity to return to initial mounting positions of the first and second auxiliary compasses.

6. The clinocompass of claim 5, wherein the coupling member comprises a bellows.

7. The clinocompass of claim 5, wherein the first spring hinges are installed on lower end portions of bodies of the first and second compasses, respectively, so that the first and second compasses pivot outwardly and elastically return to the initial mounting positions of the first and second compasses about the first spring hinges, and
the second spring hinge are installed on upper end portions of bodies of the first and second auxiliary compasses, respectively, so that the first and second auxiliary compasses pivot inwardly and elastically return to the initial mounting positions of the first and second auxiliary compasses about the second spring hinges.

8. The clinocompass of claim 5, wherein a rubber member is coupled to one longitudinal surface or both longitudinal surfaces of each of the first compass, the second compass, the first auxiliary compass, and the second auxiliary compass.

9. A method of measuring a strike, the method comprising:
applying an external pressure to first and second compasses provided on a base plate to rotate the first and second compasses counterclockwise and clockwise, respectively, such that the first and second compasses are rotatable outwardly of the base plate to clamp a cutting plane of an outcrop where a flat plane is not exposed and to fix the base plate;
applying an external pressure to first and second auxiliary compasses provided on the first and second compasses to rotate the first and second auxiliary compasses counterclockwise and clockwise, respectively, such that the first and second auxiliary compasses are rotatable inwardly of the base plate to doubly clamp a cutting plane of the outcrop and to doubly fix the base plate;
adjusting a level of a clinometer coupled to the base plate through a coupling member by using a level meter such that the level of the clinometer is maintained with respect to the outcrop where the flat plane is not exposed; and
measuring the strike on the outcrop where the flat plane is not exposed by using a measuring unit of the clinometer.

10. A method of measuring a dip, the method comprising:
applying an external pressure to first and second compasses provided on a base plate to rotate the first and second compasses counterclockwise and clockwise, respectively, such that the first and second compasses are rotatable outwardly of the base plate to clamp a cutting plane of an outcrop where a flat plane is not exposed and to fix the base plate;
applying an external pressure to first and second auxiliary compasses provided on the first and second compasses to rotate the first and second auxiliary compasses counterclockwise and clockwise, respectively, such that the first and second auxiliary compasses are rotatable inwardly of the base plate to doubly clamp a cutting plane of the outcrop and to doubly fix the base plate;
arranging a clinometer, which is coupled with the base plate through a coupling member, on the base plate to maintain the clinometer perpendicularly to the strike on the outcrop where the flat plane is not exposed; and
measuring the dip on the outcrop where the flat plane is not exposed by using a measuring unit of the clinometer.

* * * * *